May 10, 1932.  A. Y. DODGE  1,857,365

VARIABLE SPEED TRANSMISSION

Filed March 12, 1930   2 Sheets-Sheet 1

Witness
David S. Magnusson

Inventor:
Adiel Y. Dodge
By Jones, Addington, Ames & Seibold
Attys

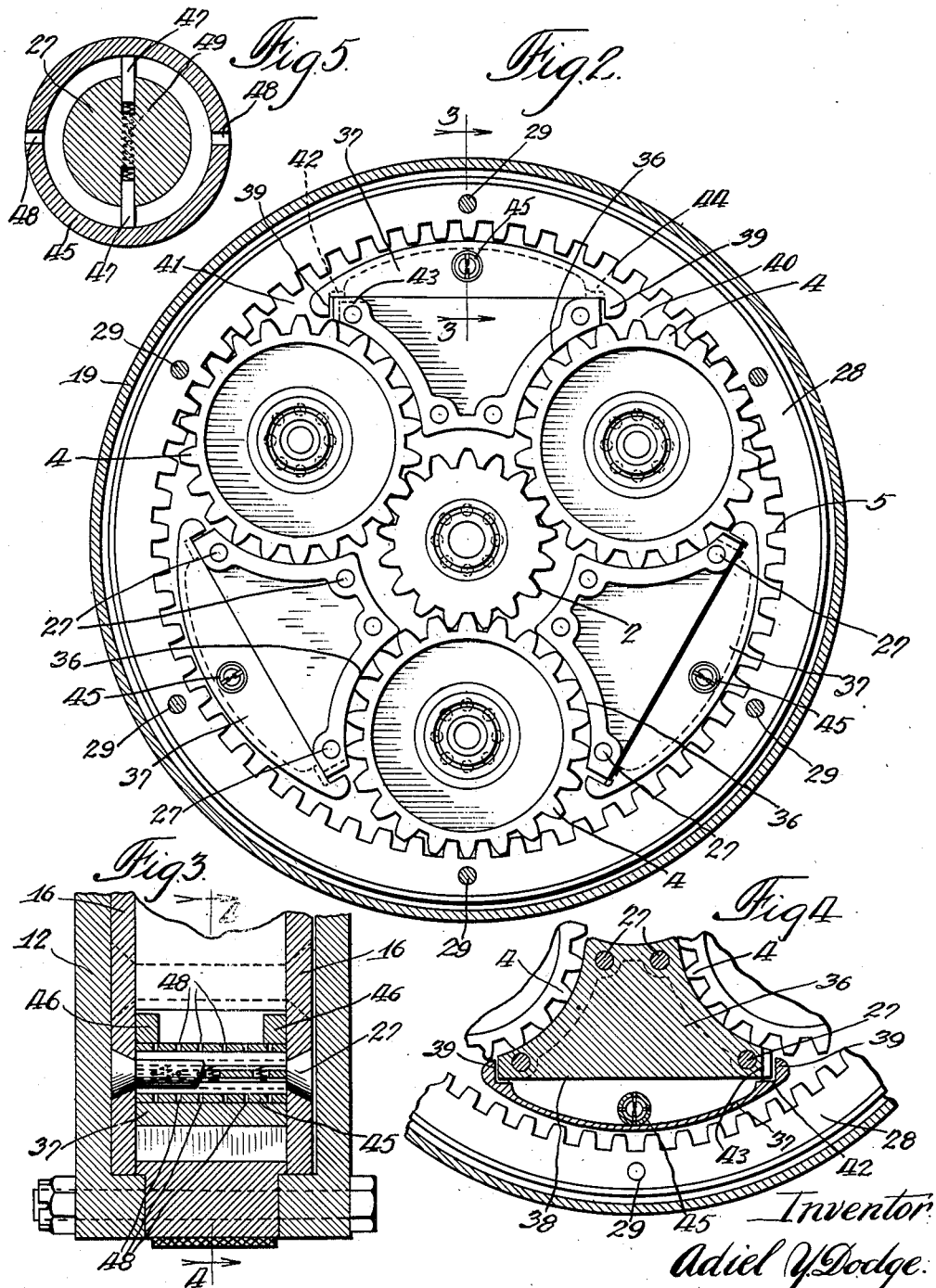

Patented May 10, 1932

1,857,365

UNITED STATES PATENT OFFICE

ADIEL Y. DODGE, OF SOUTH BEND, INDIANA

VARIABLE SPEED TRANSMISSION

Application filed March 12, 1930. Serial No. 435,139.

My invention relates to variable speed transmissions, and to the general type of transmission shown in my copending applications Serial No. 180,403, filed April 2, 1927 and Serial No. 320,242, filed November 19, 1928.

One of the objects of my invention is to provide a transmission of this type in which a driven member may be alternatively connected either directly with the driving gear or with the gear carrier, or with the driven gear.

A further object is to provide improvements in the fluid control for determining the amount of precession.

A further object is to provide a variable speed transmission of this type which can be readily adapted to present automobile practice.

A further object is to provide improved means for retaining the oil or other fluid in the reservoir and for replenishing the oil without disassembling.

A further object is to provide improvements in the valve controlling the fluid flow which determines the amount of precession and, consequently, the speed ratio.

Further objects will appear from the description and claims.

In the drawings, in which an embodiment of my invention is shown—

Fig. 2 is a section on the line 2—2 of Fig. 1;

Fig. 3 is a section on the line 3—3 of Fig. 2;

Fig. 4 is a section on the line 4—4 of Fig. 3; and

Fig. 5 is an enlarged section showing a dash-pot construction substantially on the line 4—4 of Fig. 3.

Figure 1:
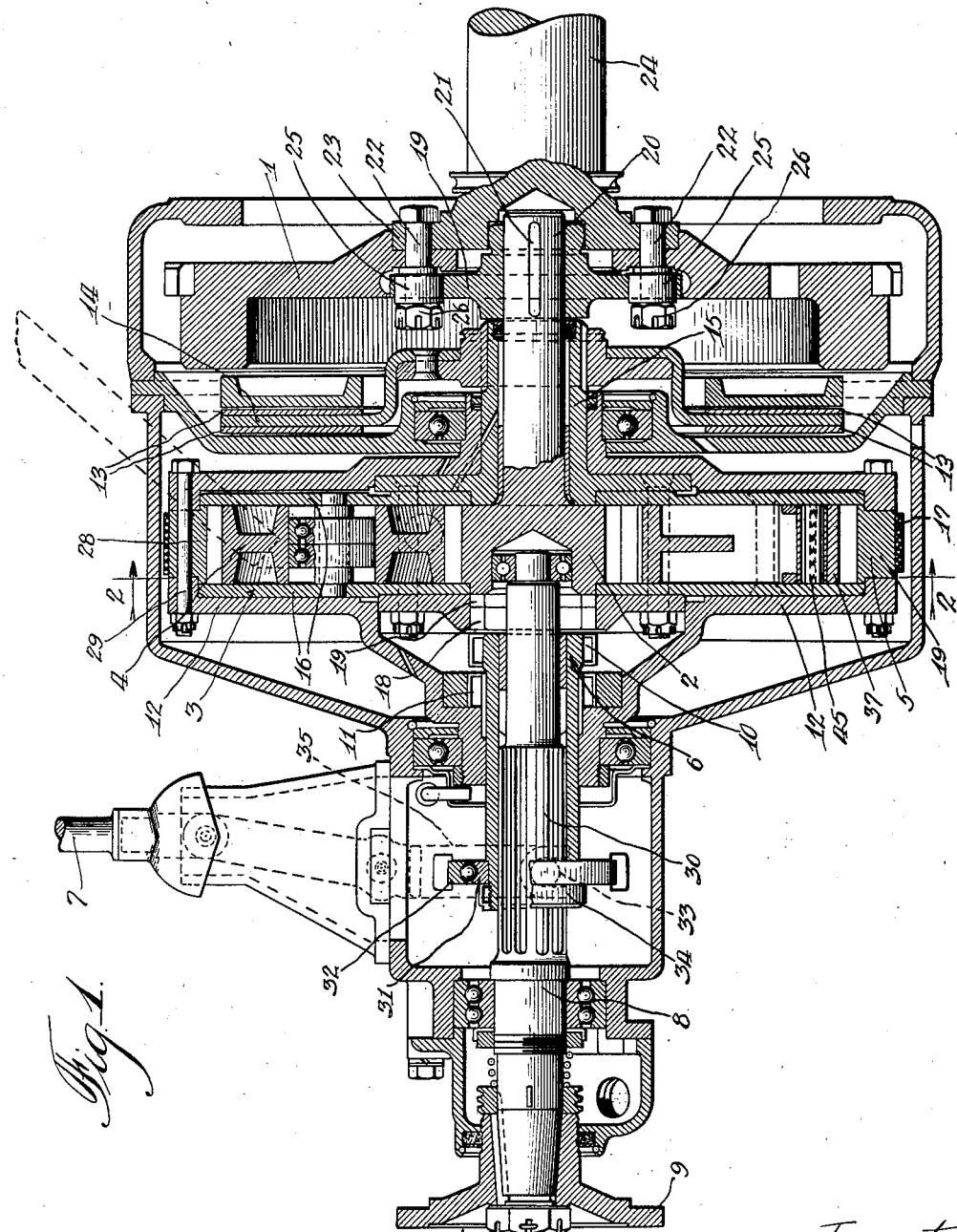
Figure 1 is an axial section showing my variable speed transmission applied between the fly wheel of the engine of an automobile and the universal connection.

Referring to the drawings in detail, the construction shown comprises a fly wheel of an automobile engine, a drive pinion 2 secured to rotate with the fly wheel 1, a gear carrier 3 coaxial with the driving pinion 2, three planet gears 4 mounted on the gear carrier 3 and meshing with the driving gear 2, a reversible ring gear 5 meshing with the planet gears 4, fluid flow means for controlling the amount of precession of the driving gear 2 with respect to the gear carrier 3, a driven member 6 coaxial with the driving gear 2 and shiftable axially to four different positions, so as to be alternatively and selectively either connected to rotate with the ring gear 5, with the gear carrier 3, direct with the driving gear 2, or in neutral position. The shifting of this driven member 6 to any one of the four positions is controlled by means of a four-position lever 7 which may occupy substantially the usual position of the gear shift lever and which can be shifted back and forth to bring the driven member 6 into any one of the four positions specified. This axial shiftable driven member 6 is splined to the forward end of the propeller shaft 8. The rear end of this propeller shaft member 8 may be provided with a universal joint member 9 for connection with any suitable rear propeller shaft member.

Before going further into details of construction, I will briefly outline the operation of the transmission for reverse, for positive low speed forward, for automatic pick-up forward speed and for direct high speed. As will be explained more in detail hereinafter, the construction is such that the higher the speed of the gear carrier 3 the greater will be the restriction to flow of the fluid so that with the higher speed there is a correspondingly greater resistance to precession of the driving gear 2 with respect to the gear carrier 3. As will also be explained in detail hereinafter, means may be provided (although not always necessary) by means of which the ring gear 5 may be held against rotation to effect positive slow speed forward, when desired. In connection with the reverse movement, clutch means are provided for holding the gear carrier against movement so that forward rotation of the driving gear 2 will produce reverse rotation of the ring gear 5.

Reverse

For reverse movement of the propeller shaft with respect to the engine shaft, the change speed lever 7 is shifted to bring the splined driven member 6 to its rearmost position in which the dog clutch teeth 10 on the splined driven member 6 are in engagement with the dog teeth 11 on the side plate 12 of the ring gear 5. By means of suitable operating means (not shown) the non-rotatable plates 13 are caused to grip the rotatable clutch plate 14 thus holding the gear carrier 3 against rotation since this rotatable clutch member 14 is mounted on the quill or sleeve 15 to which the gear carrier plates 16 are secured. Under these conditions, forward rotation of the driving gear 2 or pinion will cause reverse rotation of the ring gear 5 and hence of the propeller shaft in accordance with the well understood principles of planetary gearing. As will be pointed out hereinafter, the valve mechanism controlling the fluid flow which controls the precession of the planetary gearing may be so designed and constructed that for this reverse rotation it will permit practically unrestricted flow.

*Positive low speed forward*

While it may not always be desirable to provide for positive low speed forward, nevertheless this might be desirable under certain circumstances and I have accordingly disclosed a clutch band 17 by means of which the ring gear 5 may be held against rotation when desired. The clutch band may be manually operated by any suitable means, such as those disclosed in my copending application Serial No. 180,403, filed April 2, 1927. If automatic control is desired, means controlled by centrifugal force might be used to prevent reverse rotation of the ring gear except when the gear carrier is held against movement, automatically releasable upon high forward speeds of the ring gear, such as shown in my copending application Serial No. 320,242, filed November 19, 1928. With this construction, therefore, for positive low speed forward, the speed change lever 7 is shifted to bring the clutch teeth 10 of the splined driven member 6 into engagement with the clutch teeth 18 of the gear carrier 3 and suitable control mechanism is operated to cause the clutch band 17 to hold the ring gear 5 against rotation. With this construction, the gear carrier 3 will be positively driven but at a lower speed of rotation than the driving gear in accordance with the well-known laws of precession of planetary gearing.

*Automatic intermediate speed pick-up*

In this operation the change speed lever 7 is shifted to bring the clutch teeth 10 of the axially shiftable driven member 6 into engagement with the teeth 18 of the gear carrier 3 and the amount of precession of the driving gear 2 with respect to the gear carrier 3 is automatically controlled by centrifugal force in such manner that the higher the speed of the gear carrier 3 the greater will be the resistance to precession and the greater the tendency to bring the gear carrier 3 up to the speed of the driving gear 2. A speed will finally be attained at which the centrifugal force will prevent any appreciable precession whatever, whereupon the speed change lever 7 may be shifted to bring the teeth 10 of the axially shiftable driven member 6 into direct positive engagement with the clutch teeth 19 on the driving gear 2, thus effecting a positive one-to-one transmission.

Referring to the construction more in detail, the drive pinion 2 may be secured to rotate with the fly wheel 1 by means of a flanged collar 19 keyed to the shaft 20 of the pinion at 21. The collar of the flange has a readily detachable connection with the fly wheel 1 by means of the studs or bolts 22 which secure the fly wheel 1 to the flange 23 of the crank shaft 24, the flange of the collar 19 being provided with suitable openings large enough to receive the collars or sleeves 25 through which the bolts 22 extend, the diameter of these collars or sleeves being slightly larger than the greatest diameter of the nuts 26 for the bolts 22 so that these nuts 26 can pass through the openings in the flange in the assembly. The side plates 16 of the gear carrier 3 fit snugly against the sides of the drive pinion 2 and the planetary gears 4 and may be held together by means of suitable rivet members 27. The side plates 12 of the ring gear 5 may be secured to the annular toothed part 28 by means of bolts 29 extending through the side plates 12 and the annular part 28. The driven clutch member 6 is splined to the propeller shaft 8 at 30 and has a ball bearing connection with the change-speed lever 7 comprising an inner ball race member 31 which rotates with the driven member 6 and an outer non-rotatable ball race member 32 having a pair of trunnions 33 on its opposite sides for engagement with the forked portions 34 of the two arms 35 in which the lower end of the change-speed lever 7 terminates.

Coming now to a more detailed description of the fluid flow control, this comprises three reservoir members 36 rigidly secured to and between the side plates 16 of the gear carrier 3 by means of the rivet members 27, and three combination valve and cover members 37, one for each reservoir movably mounted adjacent these reservoirs, respectively. Each of these valve members 37 is mounted so as to be capable of radial movement between its seat on the reservoir 36 and the teeth of the ring gear 5 and also so as to be capable of tangential movement along the flat outer face 38 of the reservoir 36. This tangential movement is limited by the inwardly extending tips 39 of the valve member 37 which will come into contact with the adjacent portions of the reservoir 36 to limit the movement in each direction. The direction of flow of the fluid between the valve member 37 and the teeth of the ring gear 5 will determine which one of the ends 39 of the valve member 37 will come into engagement with the adjacent portion of the reservoir 36. In the intermediate forward speeds discussed above, the direction of movement is such that the flow of the fluid will bring the right-hand end 39 of the upper valve 37 of Fig. 2 into engagement with the adjacent end of the reservoir 36. In this position of the valve, communication would close between the reservoir and the pressure chamber 40 formed between the planet gear 4, ring gear 5 and valve member 37. It will be noted, however, that while under these conditions, communication is closed between the pressure chamber 40 and the reservoir 36, nevertheless communication will be open between the chamber 41 at the left-hand side of the upper valve member 37 and the reservoir 36 through the groove or passage 42 in the valve member 37 thus permitting additional oil from the reservoir 36 to flow out to fill the chamber 41, or enabling any excess oil in the chamber 41 due to expansion caused by heat or other causes to flow back into the reservoir 36. This open passage 42 on the low pressure side thus enables oil to flow into and out of the reservoir 36 to take care of the varying requirements of the fluid circulation system.

It may be desired that the fluid shall circulate freely in the reservoir 36 during reverse movement and for this purpose I have provided a groove or passage 43 in the reservoir 36 which maintains open communication between the chamber 41 and the reservoir 36 regardless of the position of the valve 37 with respect to the reservoir 36. This would permit relatively free circulation through the reservoir 36 during reverse movement as the passage 44 at the right-hand side would be open due to the position of the valve 37, and the passage 43 at the left-hand side is always open. The radial position of the valve 37 is determined mainly by the action of two opposing forces (1) the centrifugal force acting on the valve 37 tending to move it radially outwardly (this centrifugal force acting on the valve 37 itself and on the fluid contained within the reservoir 36 to exert a radial outward pressure on the valve 37), and (2) the pressure of the fluid flowing between the valve 37 and the teeth of the ring gear 5 tending to force the valve 37 radially inward. The radial outward force, of course, increases as the square of the angular velocity of the gear carrier 3 so that as the speed of the gear carrier 3 increases the valve 37 throttles the flow more and more and finally a speed is attained at which the centrifugal force will practically cut off the flow between the valve 37 and the ring gear 5 thus preventing relative motion between the teeth of the planetary gearing and bringing the driven member up to the same angular velocity as the driving member.

It is obvious that it would be objectionable for the valve 37 to move tangentially along the face 38 of the reservoir 36 so rapidly as to cause a hammering of the ends 39 of the valve 37 against the adjacent portions of the reservoir 36 and to avoid such hammering a dash-pot construction is provided. This dash-pot construction comprises a tubular member 45 (Figs. 3 and 5) extending between the side walls 46 of the valve member 37, a rivet member 27 extending through the tubular member 45 and riveted to the side plates 16 of the gear carrier 3, and a pair of spring-pressed vanes 47 mounted for radial movement in the rivet 27 and extending outwardly into yielding engagement with the walls of the tubular member 45. The tubular member 45 is provided with a number of small apertures 48 which afford communication between the interior of the tubular member 45 and the outside thereof to permit the flow of fluid. Referring more particularly to Figs. 4 and 5, it will be seen that any tangential movement of the valve 37 will necessitate the flow of fluid through the restricted passages 48, thus exerting a cushioning effect upon any tangential movement. The yielding mounting for the vanes 47 permits the required radial movement of the valve 37 as well as the required tangential movement. Any suitable yielding mounting means may be provided, that shown comprising a plurality of compression springs 49 seated in suitable recesses in the rivet 27 and acting on the vanes 47 tending to urge them radially outward into engagement with the walls of the tubular member 45.

For an automobile transmission it may be desirable to design the valve so that at low speed, say from zero to 200 R. P. M., the resistance to flow will be so small as to permit the motor to idle freely, but such that at higher engine speeds, say at 1000 R. P. M., sufficient resistance to flow will be offered to cause the ring gear to approach the speed of the driving gear in driving the car and such that a still higher speed, say around 1800 to 2000 R. P. M., the resistance will become so great as to completely absorb the torque of the engine and cause the driven propeller shaft to revolve at the same speed as the engine crank shaft. These results are accomplished by providing the proper clearance between the valve and ring gear. Of course, the point at which the resistance to flow will completely change the torque of the engine will depend on the amount of throttle opening. With the throttle open to normal driving speed, it would probably be desirable to have the clearance such that the full torque would be absorbed as indicated above at a speed of about 1800 to 2000 R. P. M., but such that with the throttle wide open the full torque would not be absorbed until about 3000 R. P. M.

By means of readily derived formulas taking into account the variables entering into the situation, the required clearance between the valve and ring gear may be readily calculated to produce the desired results in speed ratio with respect to throttle opening.

I claim:

1. A variable speed transmission comprising a driving gear, a gear carrier, gearing carried by said gear carrier and meshing with said driving gear, a driven gear meshing with said gearing and coaxial with said driving gear, whereby said driving gear may precess with respect to said gear carrier, and means for controlling the amount of said precession, comprising a fluid reservoir rotatable with the gear carrier and having a surface adjacent the teeth of said gearing, a fluid passage rotatable with the gear carrier, and a movable member forming a portion of the wall of said reservoir and movable to control the flow of fluid in said passage to control the amount of said precession.

2. A variable speed transmission comprising a driving gear, a gear carrier, gearing carried by said gear carrier and meshing with said driving gear, a driven gear meshing with said gearing and coaxial with said driving gear, whereby said driving gear may precess with respect to said gear carrier, and means for controlling the amount of said precession, comprising a fluid reservoir rotatable with the gear carrier, a fluid passage rotatable with the gear carrier, and a movable member forming a portion of the wall of said reservoir and movable to control the flow of fluid in said passage to control the amount of said precession.

3. A variable speed transmission comprising a driving gear, a gear carrier, gearing carried by said gear carrier and meshing with said driving gear, a driven gear meshing with said gearing and coaxial with said driving gear, whereby said driving gear may precess with respect to said gear carrier, and means for controlling the amount of said precession, comprising a fluid reservoir rotatable with a gear carrier, a fluid passage rotatable with the gear carrier, and a movable member forming a portion of the wall of said reservoir and movable to control the flow of fluid in said passage to control the amount of said precession, said fluid passage lying between said movable member and the teeth of the driven gear.

4. A variable speed transmission comprising a driving gear, a gear carrier, gearing carried by said gear carrier and meshing with said driving gear, a driven gear meshing with said gearing and coaxial with said driving gear, whereby said driving gear may precess with respect to said gear carrier, and means for controlling the amount of said precession, comprising a fluid reservoir rotatable with the gear carrier, a fluid passage rotatable with the gear carrier, and a movable member forming a portion of the wall of said reservoir and movable to control the flow of fluid in said passage to control the amount of said precession, said movable member being controlled by centrifugal force.

5. A variable speed transmission comprising a driving gear, a gear carrier, gearing carried by said gear carrier and meshing with said driving gear, a driven gear meshing with said gearing and coaxial with said driving gear, whereby said driving gear may precess with respect to said gear carrier, and means for controlling the amount of said precession, comprising a fluid reservoir rotatable with the gear carrier, a fluid passage rotatable with the gear carrier, and a movable member forming a portion of the wall of said reservoir and movable to control the flow of fluid in said passage to control the amount of said precession, said movable member being shiftable back and forth depending on the direction of rotation of said reversible gear and having provisions whereby said shifting varies the communication between the space within said reservoir and the space outside thereof.

6. A variable speed transmission comprising a driving gear, a gear carrier, gearing carried by said gear carrier and meshing with said driving gear, a driven gear meshing with said gearing and coaxial with said driving gear, whereby said driving gear may precess with respect to said gear carrier, and means for controlling the amount of said precession, comprising a fluid reservoir rotatable with the gear carrier, a fluid passage rotatable with the gear carrier, and a movable member forming a portion of the wall of said reservoir and movable to control the flow of fluid in said passage to control the amount of said precession, said movable member being shiftable back and forth depending on the direction of rotation of said reversible gear and having provisions whereby said shifting varies the communication between the space within said reservoir and the space outside thereof, and means for cushioning said back and forth movement.

7. A variable speed transmission comprising a driving gear, a gear carrier, gearing carried by said gear carrier and meshing with said driving gear, a driven gear meshing with said gearing and coaxial with said driving gear, whereby said driving gear may precess with respect to said gear carrier, and means for controlling the amount of said precession, comprising a fluid reservoir rotatable with the gear carrier, a fluid passage rotatable with the gear carrier, and a movable member forming a portion of the wall of said reservoir and movable to control the flow of fluid in said passage to control the amount of said precession, said movable member being shiftable back and forth depending on the direction of rotation of said reversible gear and having provisions whereby said shifting varies the communication between the space within said reservoir and the space outside thereof, and dash pot means for cushioning said back and forth movement.

In witness whereof, I have hereunto subscribed my name.

ADIEL Y. DODGE.